United States Patent
Krohn et al.

[11] Patent Number: 5,988,528
[45] Date of Patent: Nov. 23, 1999

[54] SELF-CENTERING BOOM

[75] Inventors: Martin L. Krohn, Degraff; Richard D. Towner, Dawson; Daniel Larson, Benson, all of Minn.

[73] Assignee: Case Corporation, Racine, Wis.

[21] Appl. No.: 08/774,437

[22] Filed: Dec. 30, 1996

[51] Int. Cl.$^6$ .................................................... B05B 1/20
[52] U.S. Cl. ............................................................ 239/168
[58] Field of Search .................................. 239/167, 168, 239/731, 733; 901/1; 414/DIG. 917

[56] References Cited

U.S. PATENT DOCUMENTS

| | | | |
|---|---|---|---|
| 4,044,952 | 8/1977 | Williams et al. | 239/168 X |
| 4,288,034 | 9/1981 | Widmer et al. | 239/168 |
| 4,344,572 | 8/1982 | Tyler | 239/168 |
| 4,595,140 | 6/1986 | Harden et al. | 239/167 |
| 5,000,385 | 3/1991 | Trusty et al. | 239/168 |
| 5,248,091 | 9/1993 | Thyberg | 239/168 |
| 5,348,226 | 9/1994 | Heiniger et al. | 239/168 X |

OTHER PUBLICATIONS

Photograph of center hydraulic cylinder in RoGator product of Ag–Chem Equipment Co., Inc. 36 pages from the home page of Ag–Chem Equipment Co., Inc.
Pp. 5–1 Boom Tree Assembly 501575 (D).

*Primary Examiner*—Andres Kashnikow
*Assistant Examiner*—Steven J. Ganey
*Attorney, Agent, or Firm*—Faegre & Benson LLP

[57] ABSTRACT

A self-centering boom for self-propelled agricultural sprayers having a double-acting hydraulic cylinder and a magnetically actuated electrical position sensor and control for sensing and moving the boom to a centered position. The electro-hydraulic control circuit senses boom position when the boom is at or near a centered position with respect to the sprayer and automatically centers the boom when the sprayer drive train is out of a neutral condition. The hydraulic system includes a pair of pressure relief valves to allow the boom to deflect due to inertial forces when turning or when contact is made with an obstruction, with the control system returning the boom to a centered position after turning or when the boom is clear of the obstruction. A flow restricting orifice cooperates with the pressure relief valves to automatically adjust the pressure at the inlet of the relief valve to retard rapid boom movement, while not interfering with slow boom movement.

19 Claims, 6 Drawing Sheets

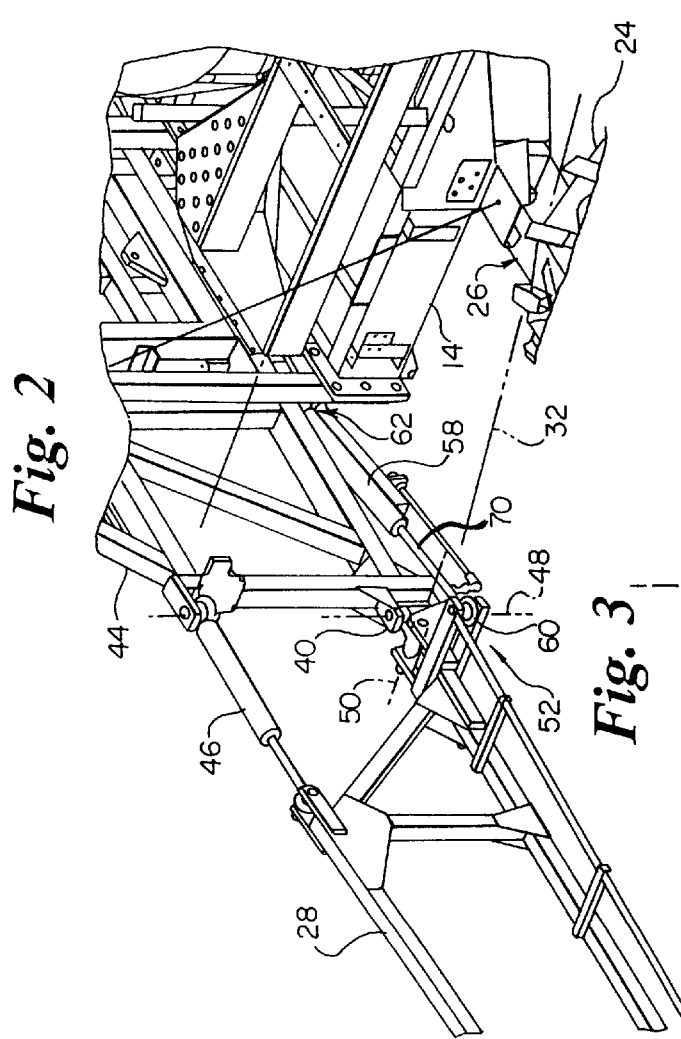

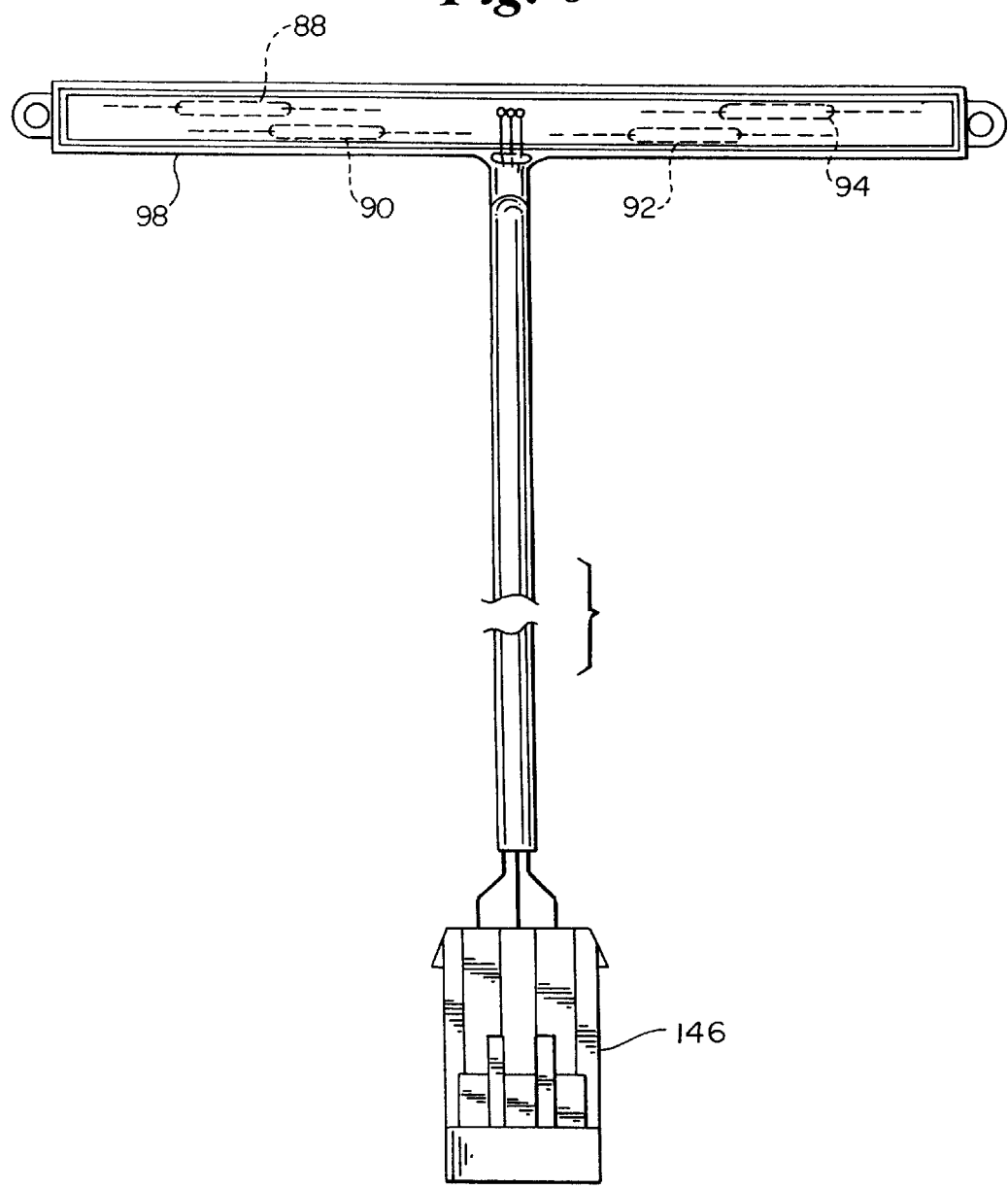

SELF-CENTERING BOOM

BACKGROUND OF THE INVENTION

This invention relates to the field of agricultural sprayers, more particularly to self-propelled sprayers having at least one, and typically two, wings or booms for spraying, with each movable from a folded or stored condition (for storage and over-the-road travel) to an extended condition (for spraying).

BRIEF DESCRIPTION OF THE DRAWINGS

FIG. 2 is a fragmentary enlarged view of a portion of FIG. 1 showing details of the connection of the right hand boom to the sprayer vehicle.

FIG. 3 is a view of the detail of a two-axis pivot for the boom-sprayer connection of FIG. 2.

FIG. 4 is a side elevation view of a hydraulic cylinder and position sensor useful in the practice of the present invention shown in an extended condition.

FIG. 5 is an enlarged side elevation view of a switch assembly of the position sensor of FIG. 4.

FIG. 6 is a bottom plan view of the switch assembly of FIG. 5.

DETAILED DESCRIPTION OF THE INVENTION

Figure 1:
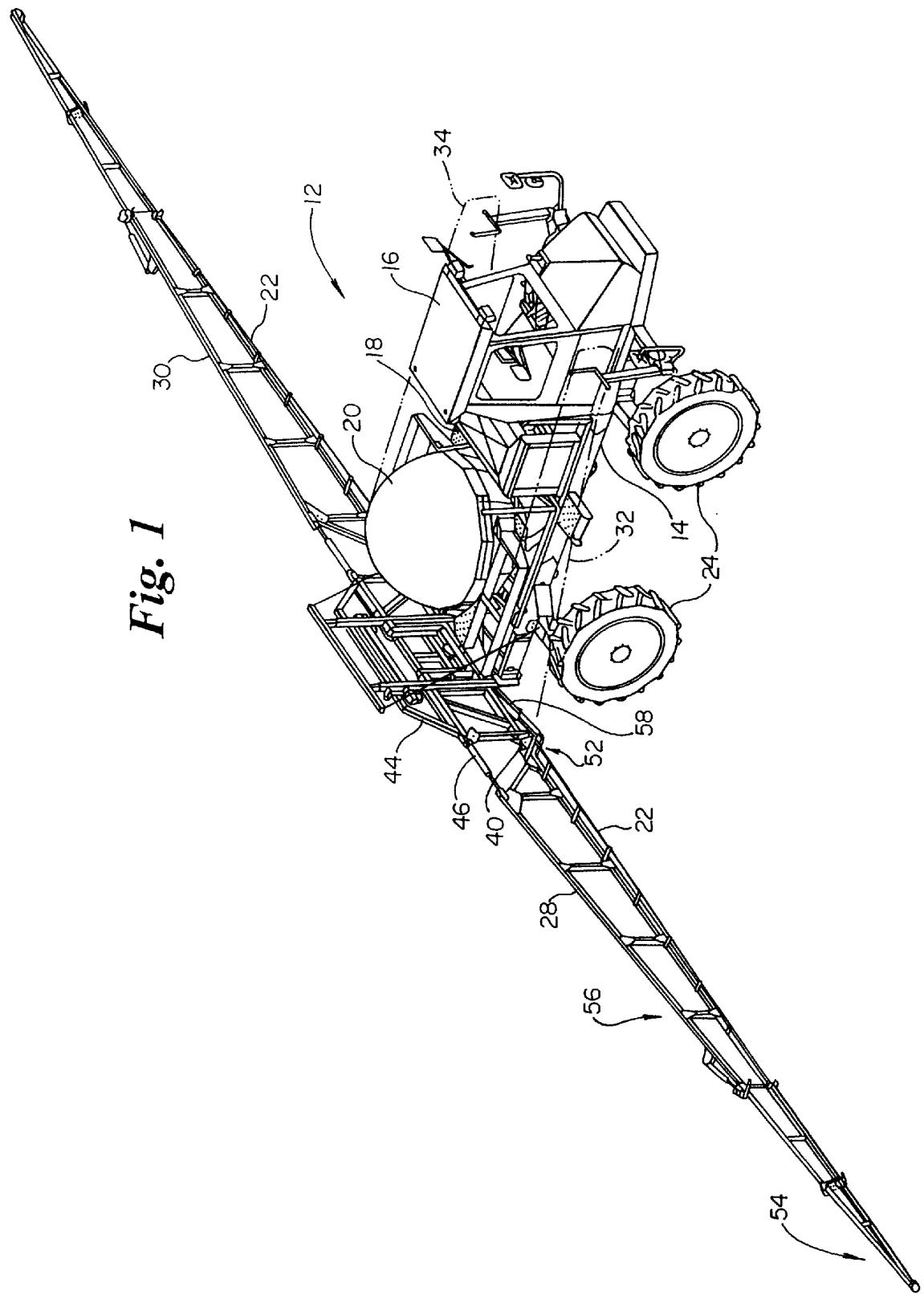
FIG. 1 is a perspective view of a sprayer having left and right hand booms useful in the practice of the present invention.
Figure 10:
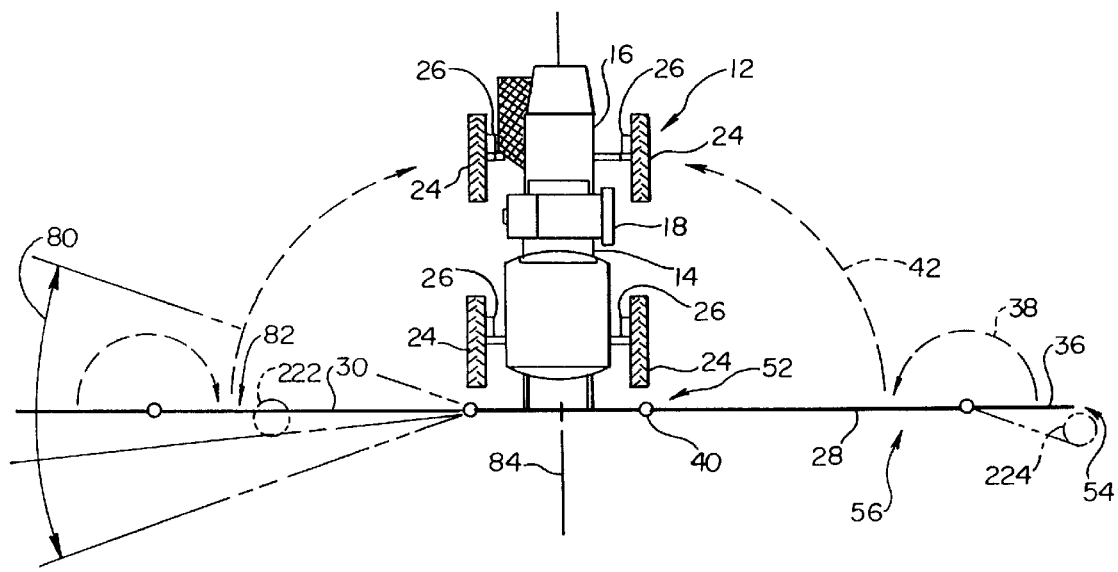
FIG. 10 is a simplified top plan view of the sprayer of FIG. 1, illustrating certain aspects of the present invention.

Referring now to the Figures, and most particularly to FIGS. 1 and 10, a sprayer 12 useful in the practice of the present invention may be seen.

Sprayer 12 is intended for applying liquid chemicals to agricultural crops by using one or two booms, each of which may be extended perpendicularly to the vehicle for spraying and each of which are retractable to a condition parallel to the vehicle for transport. Sprayer 12 preferably has a frame 14 carrying an operator's cab 16, a diesel engine and hydrostatic transmission 18 having a neutral condition, and forward and reverse drive conditions. Sprayer 12 also preferably has a tank 20 for carrying the chemicals to be applied via chemical delivery conduits and nozzles 22. Sprayer 12 also preferably has four ground engagement wheels 24 driven by hydraulically operated motors 26 (see FIG. 10).

Right hand boom 28 and left hand boom 30 are shown in a fully extended condition in FIG. 1. Each of booms 28, 30 may be retracted to respective transport positions 32, 34, shown in phantom. It is to be understood that each boom 28, 30 may be as long as 40 feet, with a center section of 10 feet, resulting in an overall boom tip to tip length of 90 feet.

Referring now most particularly to FIG. 10, to move boom 28 from the deployed or spraying condition shown, an outer boom section 36 is folded IN as shown by dashed line 38. Boom 28 is then moved about pivot 40 in the direction of dashed line 42 until the boom is in position 32 (as indicated in FIGS. 1 and 2). The left hand boom 30 is folded in a similar manner as indicated in FIG. 10.

Referring now again to FIG. 1, booms 28 and 30 are supported by a center section or carriage 44 which may be used to raise and lower booms 28, 30 simultaneously. Pivot 40, in addition to allowing the horizontal movement indicated by dashed line 42, also permits vertical articulation of boom 28 via hydraulic cylinder 46 to accommodate inclined ground surfaces adjacent sprayer 12.

As may be seen most clearly in FIG. 3, pivot 40 permits rotation of boom 28 about a vertical axis 48 and a horizontal axis 50. It can thus be seen that boom 28 has an inboard end 52 and an outboard end 54 with supporting structure 44 carrying the boom 28 and permitting the boom to be pivotably moved between an extended condition 56 and a retracted condition 32. A boom actuator 58 is preferably a double-acting hydraulic cylinder and has a first end 60 connected to the boom 28 at the inboard end 52 thereof. Actuator 58 also has a second end 62 connected to the supporting structure 44 for extending and retracting the boom 28 with respect to the supporting structure. A gable-shaped spacer 64 is located between first end 62 of actuator 58 and supporting structure 44 to permit vertical and horizontal articulating (pivoting) movement of actuator 58, while preventing rotation of actuator 58 about its axis 66. It is to be understood that hydraulic actuator 58 has a cylinder or sleeve 68 and a rod 70. Sleeve 68 has a first hydraulic port 72 and a second hydraulic port 74 for moving rod 70 via an internal piston 73 (shown in FIG. 9) with respect to sleeve 68 when pressurized fluid is applied to port 72 or 74, respectively.

A position sensor 76 is coupled to actuator 58 and provides a signal on leads 78 representative of boom position when the boom 28 or 30 is in a centering region 80 (see FIG. 10) surrounding a predetermined boom position 82 which is preferably at 90 degrees to the vehicle axis 84.

Figure 9:
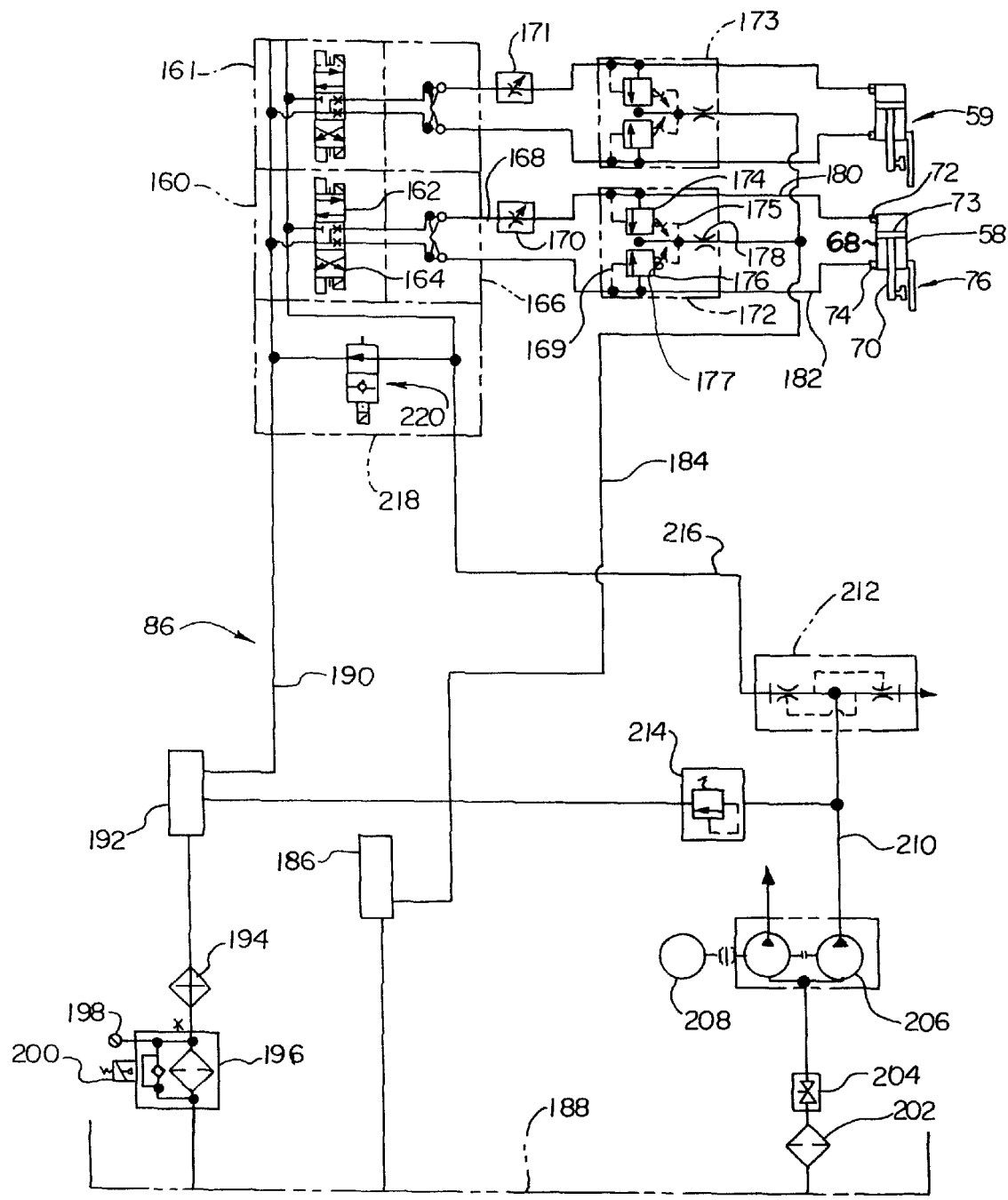
FIG. 9 is a schematic of a hydraulic circuit controlled by the electrical circuit of FIG. 8 and useful in the practice of the present invention.

In the embodiment shown, the boom actuator 58 is energized by an energizing means or hydraulic circuit 86 shown in FIG. 9. The centering region 80 is preferably plus and minus 20 degrees with respect to the predetermined boom position 82.

Referring now most particularly to FIGS. 4, 5, and 6, the position sensor 76 includes a plurality of magnetically actuated switches 88, 90, 92, 94 and a magnet 96 moveable in response to changes in the position of the boom 28. Switches 88–94 are preferably mounted in an enclosure 98 which in turn is mounted to sleeve or cylinder 68 of actuator 58. As may be seen in the electrical schematic 100 of FIG. 8, switches 88 and 90 are connected in parallel with each other and switches 92 and 94 are similarly connected in parallel with each other. This effectively provides an OR condition such that if the magnet is proximal to switch 90 or switch 88 (or to both), the connection is made between lead 102 and lead 104. It is to be understood that additional switches may be added to extend the range of position sensor 76.

Figure 7:
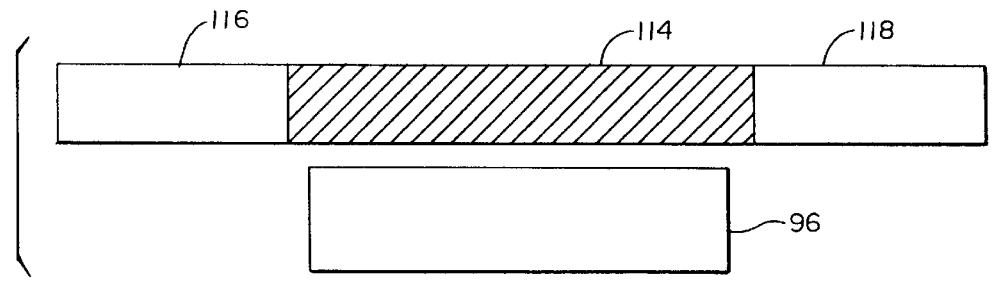
FIG. 7 is a simplified diagram illustrating operation of the position sensor of FIG. 4.

Magnet 96 is mounted to a carrier 106 which is preferably adjustably mounted to a tie rod 108 carried by cylinder rod 70. Magnet carrier 106 is preferably slidingly retained in a track or C-shaped channel 110 which allows sliding movement of magnet 96 along the sleeve 68 of hydraulic cylinder 58 in both "extending" and "retracting" directions parallel to actuator axis 66. Carrier 106 is preferably formed of or includes a low friction sliding bearing such as a block of ultra high molecular weight polyethylene 112. Switch assembly 98 and magnet 96 are available from Power Components of Midwest, Inc. at P.O. Box 1348 Mishawaka Id. 46546-1348 as part numbers 00433 and 00441 respectively. As may be seen most clearly with respect to FIG. 7, position sensor 76 preferably has a deadband 114 and active regions 116 and 118. It is to be understood that the magnet 96 is shown adjacent the deadband 114 in FIG. 7; this corresponds to the condition shown in FIG. 8 with magnet 96 centered with respect to enclosure 98 and with switches 88, 90, 92, and 94 all in an open condition. From the centered position shown, magnet 96 can move up to ¼" within the deadband towards either active region 116 or 118 before any switch closure occurs. Once magnet 96 moves ¼" towards active region 116, (as indicated by arrow 226 in FIG. 8) switch 92 will close. As magnet 96 moves further towards or into active region 116, switch 94 will close before switch 92 opens. The length of active regions 116 and 118 are preferably 2½" each. The operation of switches 90 and 88 is similar when magnet 96 moves towards active region 118 (as indicated by arrow 228). It is to be understood that the position sensor 76 will indicate that the boom is in the predetermined or self-centered condition when magnet 96 is in deadband 114 as shown in FIG. 7. It is also to be understood that the centering region 80 shown in FIG. 10 corresponds to the total span of active region 116 together with the deadband 114 and the active region 118 of FIG. 7.

Figure 8:
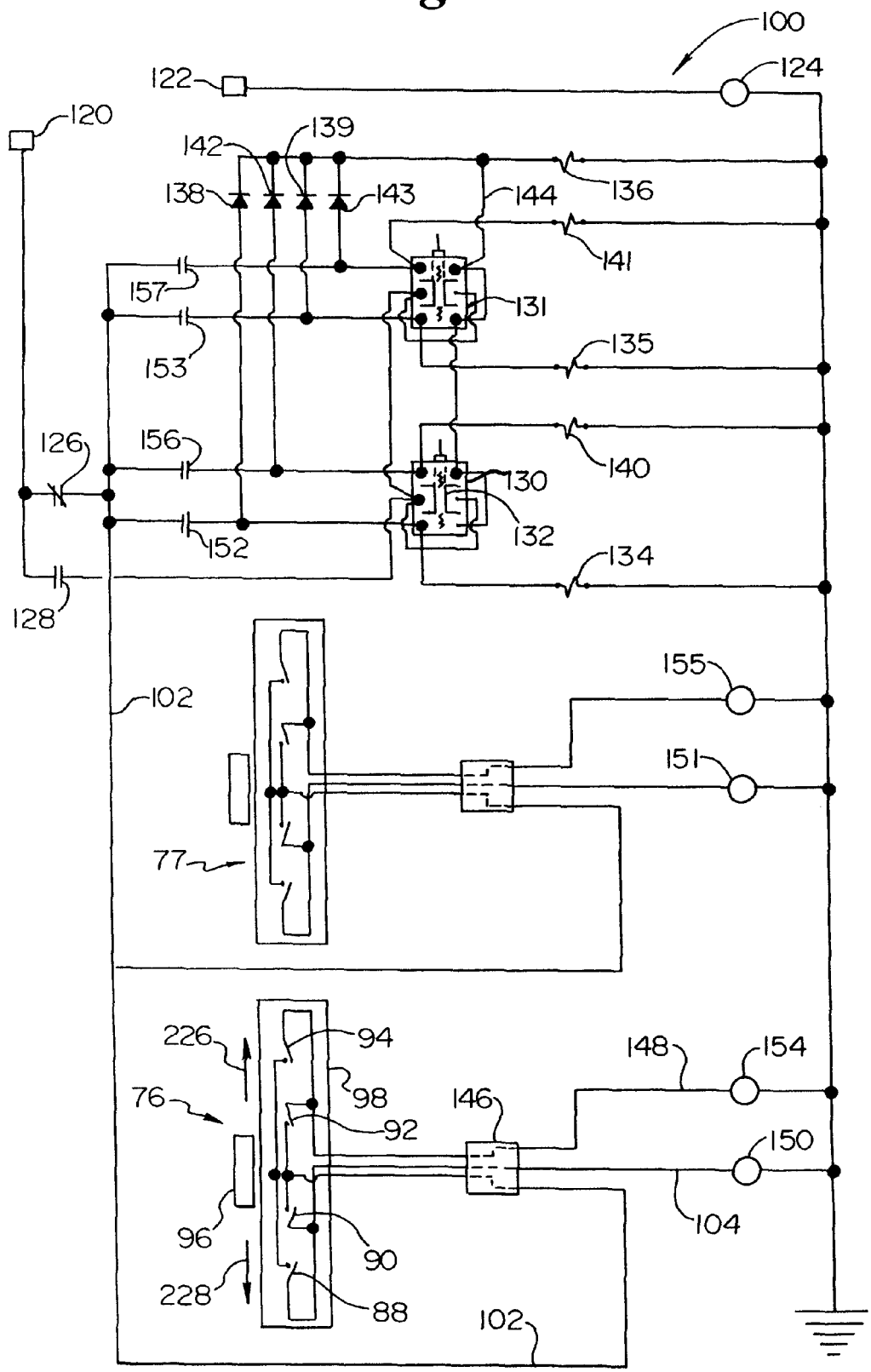
FIG. 8 is a schematic of an electrical circuit useful in the practice of the present invention.

Referring now to FIGS. 8 and 9, the electrical and hydraulic aspects of the present invention may be seen. In electrical schematic 100 of FIG. 8, terminal 120 is connected to the vehicle ignition switch and to +12 volts when the ignition switch is ON. Terminal 122 has 12 volts applied to it when the transmission of the sprayer 12 is in a neutral condition. Terminal 122 has 0 volts applied to it when the transmission is in drive (forward or reverse). It is to be understood that no voltage is present at terminal 120 when the vehicle ignition switch is in the OFF condition. A BOOM MOVEMENT ENABLE relay coil 124 is connected to terminal 122 and has an associated normally closed contact 126 and an associated normally open contact 128. Relay 124 and contacts 126 and 128 enable movement of right hand boom 28 via RIGHT HAND INNER BOOM FOLD switch 130 when the sprayer 12 has its transmission in neutral with the ignition switch ON. Boom centering is enabled when the transmission of sprayer 12 is out of a neutral condition with power being applied to line 102 via contact 126 (when the ignition is ON). Switch 130 is preferably a double-pole double-throw, center-off, momentary-type switch with a spring return to center. As shown in FIG. 8, switch 130 is in the center (OFF) condition. Moving the armature 132 of switch 130 to the EXTEND position (downward in FIG. 8) will apply power to the RIGHT HAND BOOM EXTEND solenoid 134 and the unloader solenoid 136 via diode 138 and lead 144 provided that the transmission of sprayer 12 is in the neutral position causing contact 128 to close. Similarly, the RIGHT HAND BOOM RETRACT solenoid 140 is energized when armature 132 is moved to close the paths between the respective center and upper terminals of switch 130 which is then in the RETRACT position. With switch 130 in the RETRACT position, the unloader solenoid 136 is also energized via diode 142 and via lead 144 which connects back through jumpers to contact 128.

Boom centering circuitry includes position sensor 76, connected by an electrical connector 146 (also shown in FIG. 6) to lead 102, lead 104, and lead 148. Lead 104 is connected to a coil 150 of a RIGHT HAND BOOM EXTEND relay having a normally open contact 152. Lead 148 is connected to a coil 154 of a RIGHT HAND BOOM RETRACT relay having a normally open contact 156. Contact 152 is connected between lead 102 and RIGHT HAND BOOM EXTEND solenoid 134 and is coupled to the unloader solenoid 136 via diode 138. Contact 156 is connected between lead 102 and the RIGHT HAND BOOM RETRACT solenoid 140 and via diode 142 to the unloader solenoid 136.

It is to be understood that the position sensor 77 for the left hand boom 30 is similarly connected and operates in the same manner as the circuitry for the right hand boom 28. Particularly, the left hand boom circuitry has a LEFT HAND BOOM EXTEND relay 151 and associated normally open contact 153 connected to a LEFT HAND BOOM EXTEND solenoid 135. A LEFT HAND BOOM RETRACT relay 155 has a normally open contact 157 connected to a LEFT HAND BOOM RETRACT solenoid 141. Similarly, diodes 139 and 143 are coupled to unloader solenoid 136. Left hand boom 30 may be extended or retracted manually the same as the right hand boom 28 by LEFT HAND INNER BOOM FOLD switch 131, but only when the transmission of sprayer 12 is in neutral.

Referring now most particularly to FIG. 9, a RIGHT HAND INNER BOOM FOLD directional control valve 160 is coupled to and controlled by the RIGHT HAND BOOM EXTEND and RETRACT solenoids 134, 140. The EXTEND solenoid 134 causes valve 160 to operate in a manner in accordance with block 162, while energization of the RIGHT HAND BOOM RETRACT solenoid 140 causes valve 160 to act in accordance with block 164. Valve 160 is shown in FIG. 9 in a condition corresponding to the de-energization of both the EXTEND and RETRACT solenoids 134 and 140. Valve 160 is preferably a Waterman directional control valve, model 118744-00 available, for example, from the J.N. Fauver Co., Inc. having an address at 10286 West 70th Street, Eden Prairie, Minn. 55344-3340. The output lines of valve 160 are connected to a Waterman model 118779-00 double pilot operated check valve module 166, also available from Fauver. The BOOM EXTEND output line 168 is coupled through an adjustable non-pressure-compensated needle valve 170 to a self-centering relief block 172, available from Fauver as model FV-4327-AA-1423. Relief block 172 has a pair of pilot operated pressure relief valves 174, 176 (available from Fauver as a Command Controls Corp. model RVPS-10-N-S-0-50, as shown and described in U.S. Pat. No. 5,546,980, Floating Cage Cartridge Valve and Knob, the disclosure of which is expressly incorporated herein by reference). Each of valves 174 and 176 are coupled to a fixed orifice member 178 preferably having an opening therethrough with a diameter of 0.038 inches.

It is to be understood that it is preferable (but not necessary) that the size of the opening of orifice member 178 be alterable (by using a replaceable orifice member 178 threaded into block 172) to "fine tune" operation as desired. Once desired operation is obtained, the opening of orifice member 178 is preferably held constant and need not be altered (nor even alterable, unless boom inertia is changed, for example by adding or removing equipment to the boom).

Output line 180 from the self-centering relief block 172 is connected to the first hydraulic port 72 of a right hand boom actuator 58. Similarly, output line 182 is connected to the second hydraulic port 74 of hydraulic actuator 58. An over-pressure return line 184 is connected from orifice 178 through a hydraulic oil manifold 186 to hydraulic oil reservoir 188. A "normal" return line 190 is coupled via a hydraulic oil manifold 192, an oil cooler 194, and a filter assembly 196 to reservoir 188. Assembly 196 may have a pressure gauge 198 and a filter pressure indicator switch 200 to actuate a warning light (not shown).

Oil is supplied from reservoir 188 via a suction strainer 202, a suction gate valve 204, and a hydraulic tandem gear pump 206 driven from the power take-off connection 208 of the diesel engine 18 of sprayer 12. A high pressure line 210 is connected to a priority flow divider 212 and a system relief valve 214. High pressure line 216 is connected to a Waterman unloader module 218, model number 12DS-UM-8-12-P, also available from Fauver. The unloader valve 220 of module 218 is actuated to the blocked position when unloader solenoid 136 is energized. Unloader valve 220 is shown in the condition corresponding to the de-energized state of unloader solenoid 136. As with the electrical subsystem, a LEFT HAND INNER BOOM FOLD control valve 161 is coupled via a needle valve 171 to a left hand relief block 173 and ultimately to the left hand boom actuator 59. It is to be understood that the left hand boom hydraulic subsystem is connected similarly and preferably operates identically to the right hand boom subsystem and shares the unloader module and supply and return paths and components.

Referring now to FIG. 8, 9, and 10, boom folding and unfolding operation is as follows. Only one boom will be described, because the operation of each of the right and left hand booms is identical.

Manual Boom Unfolding

To manually move the right hand boom from the folded or transport position 32 (shown in FIG. 1 in phantom), the vehicle transmission is placed in neutral energizing relay 124, closing contact 128 and applying 12 volt power from terminal 120 to the manual boom movement RIGHT HAND INNER BOOM FOLD switch 130. The armature 132 of switch 130 is (manually) moved downward to energize the RIGHT HAND BOOM EXTEND solenoid 134 and the unloader solenoid 136. Solenoid 136 will move the unloader valve to blocked position between lines 216 and 190, blocking flow of fluid through unloader 218. Solenoid 134 will move block 162 of the RIGHT HAND INNER BOOM FOLD control valve into an operating position between the input and output of the module containing valve 160. Hydraulic fluid will then flow into port 72 extending the right hand inner boom 28 as long as switch 130 is maintained in the BOOM EXTEND position. It is to be understood that the operator only needs to move the boom to within the operating range of the centering region 80, since once the vehicle transmission is taken out of a neutral condition, the boom will automatically center itself. Before vehicle operation is commenced, the outer boom section 36 is preferably deployed, either manually or through the use of a similar electro-hydraulic system used for the inner boom section 28.

Automatic Boom Centering

With the boom in the extended position 56, the vehicle transmission is placed in a forward (or reverse) drive condition, de-energizing relay 124, opening contact 128 and closing contact 126. Twelve volt power is now applied to lead 102 enabling the operation of the self-centering subsystem. Magnet 96 is now within the centering region or operating range of switch assembly 98. If magnet 96 is centered with respect to assembly 98, switches 88, 90, 92, 94 remain open and no boom movement will occur. If the boom is not centered, one of the switches of assembly 98 will be closed by magnet 96. For example, if the boom is hyperextended or deflected back (as is shown for left hand boom in FIG. 10) either switch 92 or 94 will be closed because magnet 96 will be adjacent thereto. Such a condition will energize the RIGHT HAND BOOM RETRACT relay 154 and close its associated contact 156. Contact 156 will energize the RIGHT HAND BOOM RETRACT solenoid 140 and unloader solenoid 136. Energization of solenoid 140 will cause block 164 to become operative in the RIGHT HAND INNER BOOM FOLD control valve 160 causing hydraulic fluid to flow into port 74 retracting the boom t8 (unless the boom is in contact with an obstruction such as 222) until the boom is centered and magnet 96 is located as indicated in FIG. 8 with all switches and assembly 98 in an open condition, de-energizing solenoids 140 and 136, allowing the unloader valve 220 to assume the bypass condition shown in FIG. 9 and the RIGHT HAND INNER BOOM FOLD control valve 160 to assume the condition shown in FIG. 9 as well.

It can thus be seen that the present invention includes an energizing means in the form of a switchable energy source (hydraulic power) operable in response to the condition of the position sensor to selectively energize the boom actuator to move the boom to the predetermined (centered) position when the boom is in the centering region. In the embodiment shown and described, the boom actuator 58 is a hydraulic cylinder controlled by the electro-hydraulic valve 160. Valve 160 is electrically coupled to and responsive to the position sensor 76 and is hydraulically coupled to the hydraulic cylinder 58 so that the valve 160 permits fluid to flow to the cylinder to move the boom 28 to the predetermined (centered) position. It is to be understood that the position sensor 76 is inoperative when the boom is outside the centering region 80.

Response to Boom Deflections

The self-centering system will operate to center the boom when encountering an obstruction similar to obstruction 222, or when the boom is deflected (moved out-of-center) due to high dynamic forces encountered when the sprayer 12 is turned, accelerated or decelerated rapdily. When the boom section 28 is deflected, pressure rises in the hydraulic cylinder 58 until it reaches a predetermined level, either 2340 psi (which is the desired cracking pressure for the pressure relief valve 176) or a desired cracking pressure of 1440 psi (for valve 174). At the predetermined desired cracking pressure, hydraulic fluid will be permitted to flow through the respective activated relief valve and orifice 178 to the over-pressure return line 184 allowing rod 70 to move with respect to sleeve 68, permitting the boom section 28 to move away from the predetermined center position. As shown and described in U.S. Pat. No. 5,546,980, pressure relief valve 174 (and valve 176) is of the type to react to a predetermined pressure differential between the inlet and the outlet of the valve. Valve 174 has a pilot operation (indicated by dashed line 169) to relieve pressure from inlet to outlet above the desired cracking pressure, which is manually adjustable (indicated by arrow 177). The cracking pressure as measured at the inlet of the valve is referenced to and dependent upon the pressure at the outlet of the valve, as indicated by dashed line 175 which shows the connection between the valve outlet and an internal spring chamber which determines the setting for cracking pressure.

In the hydraulic circuit of the present invention, the pressure at the inlet of orifice 178 will increase in response to increased flow through valve 174 and orifice 178. Such increased pressure will appear at the outlet of valve 174 and be delivered via path 175 to the downstream side of the spring chamber adjacent the internal pilot of valve 174. It is thus to be understood that orifice 178 makes the relief valves 174, 176 "self-adjusting" in that the outlet pressure (as measured between the valves 174, 176 and the orifice 178)

is hydraulically available to the spring chamber in the valves, thus increasing the operating pressure (above cracking) in response to a pressure increase at the valve outlet, which in turn is due to increased flow corresponding to increased boom velocity. In other words, for slow boom velocity, the orifice 178 has little or no effect (and the cracking pressure remains as manually set, plus the internal pressure override of valve 174), but for increasingly higher boom velocities, the orifice has an increasing retarding effect on boom velocity (by restricting flow and raising the operating pressure of the valve 174 (or 176). The result is that the boom will be prevented from rapid rotational movement with respect to carriage 44 of the sprayer 12 because of the cooperation between orifice 178 and valves 174, 176 when the line pressure exceeds the desired (manually set) cracking pressure. Above the manually set desired cracking pressure, the orifice 178 continually changes the bias pressure (at the outlet of the pressure relief valve) depending upon the hydraulic fluid flow rate through the orifice 178. It is important to note that it is the increasing flow rate through orifice 178 that increases the bias pressure on the outlet of the over pressure valves 174 and 176. Without the orifice 178 present, the over pressure relief valve would allow a substantial hydraulic flow above the desired cracking pressure, resulting in rapid (and possibly damaging) boom movement (because of boom inertia) during turning. The effect of the pressure increase in response to flow increase caused by the orifice 178 can be considered equivalent to increasing the pressure override characteristic of the combination of valve 174 (or 176) with orifice 178 because the pressure at relatively high flow rates will substantially increase over the cracking pressure. For example, the valve 174 has a pressure override characteristic of 0 psi at 0.5 gpm to 200 psi at 30 gpm and which is generally linearly proportional between cracking and full flow: if the valve is set to 2340 psi desired cracking pressure, the manufacturer's specifications call for 200 psi pressure override at 30 gpm, resulting in 2540 psi operating (inlet) pressure at 30 gpm (with the outlet of valve vented to atmospheric pressure). In combination with an orifice 178 as shown in FIG. 9, with an orifice diameter, for example, of 0.040" the altered pressure override will rise from 2340 psi at cracking to 2997 psi at 1 gpm and to 5053 psi at 2 gpm because of the biasing of the valve pressure by the orifice member 178. The components of the pressure increases for the valve and orifice mentioned above are as follows:

| Flow in GPM | Pressure Override of Valve 174 | Pressure Drop across Orifice 178 | Desired Cracking Pressure | Total Pressure Drop |
| --- | --- | --- | --- | --- |
| 0 | 0 | 0 | 2340 | 0–2340 |
| 1 | 6.66 | 650 | 2340 | 2997 |
| 2 | 13.33 | 2700 | 2340 | 5053 |

It can thus be seen that as flow increases, the pressure drop across orifice 178 increases much faster than the drop (conventional pressure override) across valve 174, and is the primary control for retarding excessive boom velocity in the velocity damping aspect of the present invention. It is also to be noted that by changing the diameter of the orifice member 178, the overall pressure override characteristic of the velocity damping system can be changed, thus providing the ability to fine tune the system for different boom lengths and configurations.

Turning now to the electromagnetic portion of the system, in the event that right hand inner boom section 28 is deflected as a result of turning or encountering an obstruction, magnet 96 will move in the direction of arrow 226 (FIG. 8) indicating the boom is hyper-extended or deflected back. At this time, either or both of switches 92 and 94 will be closed, energizing the RIGHT HAND BOOM RETRACT relay 154, closing contact 156 and energizing solenoid 140. Hydraulic fluid will be delivered to the self-centering relief valve block 172 until the interference between the obstruction and boom 28 is removed. In the event that inner boom section 28 is deflected forward by an obstruction, e.g., while backing or turning the vehicle, magnet 96 would move in the direction of arrow 228, closing one or both of switches 88, 90, energizing relay 150, closing contact 152, and energizing solenoid 134. Energization of solenoid 134 will cause the block 164 to become operative in the RIGHT HAND INNER BOOM FOLD control valve directing hydraulic fluid towards port 72 to extend the boom section 28. However, the obstruction will prevent such movement, and the pressure will remain at a relief level in the self-centering relief valve block 174 permitting fluid to exit orifice 178 and return to reservoir 188 via the over-pressure return line 184. The difference in pressure settings between blocks 174 and 176 reflects the different surface area of the piston 73 on which the hydraulic fluid acts within actuator 58 because of the presence of piston rod 70. Once the obstruction is removed, the pressure relief valve 174 will return to the condition shown in FIG. 9, allowing hydraulic fluid to flow to port 74, and the boom will automatically move to the predetermined center position.

Thus it can be seen that the relief block or valve 172 operates as a means for releasing the boom from the predetermined position in the event the boom contacts an obstruction, and also causes the boom actuator to return the boom to the predetermined position when the boom is free of the obstruction.

Manually Boom Folding

When it is desired to manually retract the right hand boom 28 (e.g., to the folded or transport position 32), the vehicle transmission is placed in neutral energizing the BOOM MOVEMENT ENABLE relay 124 and closing contact 128, making 12 volt power available to switch 130. The armature 132 is preferably manually moved upward, energizing the RIGHT HAND BOOM RETRACT solenoid 140 (and the unloader solenoid 136) causing the RIGHT HAND INNER BOOM FOLD control valve 160 to move until block 164 is operative, directing hydraulic fluid to port 74 until the boom is fully retracted. Thus it can be seen that the valve 160 is manually operable (via switch 130) independently of the condition of the position sensor 76 to selectively extend and retract the boom to and from the centering region while the vehicle transmission is in neutral.

From the above description, it can be seen that the right hand boom will extend or retract, depending upon which of solenoids 134 and 140 is energized, whether (manually) by switch 130 or automatically centering) by the relays 150, 154. It is to be understood that automatic centering will only occur when the position sensor is in the centering region 80, and the vehicle transmission is out of neutral.

As has been stated, operation of the left hand boom subsystem is identical to that described for the right hand boom subsystem, and thus will not be further detailed here. Also, as has been stated, the self-centering subsystems may be duplicated for the outer boom section to provide for self-centering in the event of a contact within obstruction 224.

It is to be understood that alternative boom actuators (such as electric or pneumatic actuators) may be substituted for the hydraulic actuator 58 in the practice of the present invention; similarly, alternative position sensors (e.g., optical or pneumatic sensors) may be substituted for the magnetic position sensor 76 while staying within the spirit and scope of the present invention. For these reasons, the invention is not to be taken as limited to all of the details thereof as modifications and variations thereof may be made without departing from the spirit or scope of the invention. For example, it is contemplated to be within the present invention to use non-pilot operated type relief valves in place of valves 174, 176, if desired. For example, a direct acting relief valve such as a model A0*B2 available from Sterling Hydraulic Inc., of 920 East State Parkway, Schaumburg, Ill. 60173 is a non-pilot operated type valve believed to be suitable for use in the present invention. Similarly, relief valves 174, 176 and orifice 178 may be independent of each other (i.e., not associated in block 172) while still remaining within the scope of the present invention.

What is claimed is:

1. A boom centering assembly for use with a movable agricultural vehicle, the boom assembly comprising:
   a) a movable boom having an inboard end and an outboard end;
   b) a supporting structure carrying the boom and permitting the boom to be pivotably moved between extended and retracted conditions;
   c) a boom actuator having a first end connected to the boom and a second end connected to the supporting structure for extending and retracting the boom with respect to the supporting structure;
   d) a position sensor formed of a plurality of magnetically actuated switches and a magnet movable in response to changes in the boom position, the position sensor coupled to the boom and providing a signal representative of boom position in a centering region surrounding a predetermined boom position while the boom is in the extended condition; and
   e) energizing means for energizing the boom actuator when the boom is in the centering region to drive the boom to the predetermined boom position.

2. The boom centering assembly of claim 1 wherein the boom actuator comprises a hydraulic cylinder.

3. The boom centering assembly of claim 2 wherein the hydraulic cylinder is a double-acting type.

4. The boom centering assembly of claim 1 wherein the energizing means comprises a switchable energy source operable in response to the condition of the position sensor to selectively energize the boom actuator to move the boom to the predetermined position when the boom is in the centering region.

5. The boom centering assembly of claim 4 wherein the boom actuator is a hydraulic cylinder and the energizing means is an electrically controlled hydraulic valve electrically coupled to the position sensor and hydraulically coupled to the hydraulic cylinder wherein the valve permits fluid to flow to the cylinder to move the boom to the predetermined position.

6. The boom centering assembly of claim 4 wherein the position sensor is inoperative when the boom is outside the centering region.

7. The boom centering assembly of claim 6 wherein the means for energizing the hydraulic cylinder is manually operable independently of the condition of the position sensor to selectively extend and retract the boom to and from the centering region.

8. The boom centering assembly of claim 1 wherein the supporting structure is an inboard portion of the boom and the movable boom is an outboard portion of the boom.

9. The boom centering assembly of claim 1 wherein the energizing means further comprises a release means for releasing the boom from the predetermined position in the event the boom contacts an obstruction.

10. The boom centering assembly of claim 9 wherein the boom actuator comprises a hydraulic cylinder and the release means comprises a relief valve connected to the hydraulic cylinder to release fluid from the cylinder in the event the boom contacts an obstruction.

11. The boom centering assembly of claim 9 wherein the energizing means causes the boom actuator to return the boom to the predetermined position when the boom is free of the obstruction.

12. A method of centering a rotatable boom on a movable sprayer vehicle comprising the steps of:
   a) interposing a hydraulic cylinder between the boom and the sprayer vehicle;
   b) driving the boom to a predetermined position within a centering region extending on both sides of the predetermined position by automatically sensing and controlling the position of the boom within the centering region;
   c) allowing the boom to move out of the predetermined position in the event of contact between the boom and an obstruction; and
   d) returning the boom to the predetermined position once the boom is out of contact with the obstruction by driving the boom to the predetermined position within the centering region by automatically sensing and controlling the position of the boom within the centering region.

13. The method of claim 12 further comprising the additional step a1) between steps a) and b) of:
   a1) manually extending the boom from the vehicle until the boom is in the centering region.

14. The method of claim 12 wherein step b) further comprises moving a magnet with respect to a plurality of magnetically operable switches in response to movement of the boom to sense and control the position of the boom within the centering region.

15. The method of claim 12 wherein the movable sprayer vehicle is self-propelled and has a drive train selectively engageable into neutral, forward and reverse conditions and further wherein step b) is inhibited when the drive train is in the neutral condition.

16. A combined self-propelled vehicle and boom centering assembly comprising:
   a) a self-propelled vehicle for agricultural spraying having a plurality of wheels and a drive train engageable into neutral, forward and reverse conditions;
   b) at least one movable boom having an inboard end and an outboard end;
   c) a supporting structure on the vehicle pivotably carrying the boom and permitting the boom to be moved between extended and retracted conditions and wherein the boom may be located at a predetermined boom position in the extended condition;
   d) a boom actuator having a first end connected to the boom and a second end connected to the vehicle for extending and retracting the boom with respect to the vehicle;
   e) a position sensor coupled to the boom and providing a signal representative of boom position while the boom is in a centering region extending on both sides of the predetermined boom position and surrounding the predetermined boom position; and f) energizing means for energizing the boom actuator when the boom is in the centering region to drive the boom to the predetermined boom position within the centering region by automatically sensing and controlling the position of the boom within the centering region when the drive train is in one of the forward and reverse conditions.

17. The assembly of claim 16 further comprising:

g) means for inhibiting energization of the boom actuator when the drive train is in the neutral condition.

18. The assembly of claim 16 further comprising:

g) means for inhibiting automatic energization of the boom actuator when the boom is outside of the centering region.

19. The assembly of claim 16 wherein the boom actuator is a hydraulic cylinder.

* * * * *